US008295646B2

(12) United States Patent
Kawabe

(10) Patent No.: US 8,295,646 B2
(45) Date of Patent: *Oct. 23, 2012

(54) RESOLUTION CONVERTING METHOD

(75) Inventor: Toru Kawabe, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 686 days.

This patent is subject to a terminal disclaimer.

(21) Appl. No.: 12/497,473

(22) Filed: Jul. 2, 2009

(65) Prior Publication Data

US 2010/0008599 A1 Jan. 14, 2010

(30) Foreign Application Priority Data

Jul. 14, 2008 (JP) .................................. 2008-183096

(51) Int. Cl.
*G06K 9/32* (2006.01)

(52) U.S. Cl. .......................... 382/299; 382/298; 382/300

(58) Field of Classification Search .................. 382/298, 382/300
See application file for complete search history.

(56) References Cited

U.S. PATENT DOCUMENTS

| | | | | |
|---|---|---|---|---|
| 6,072,588 A * | 6/2000 | Dohnomae | ..................... | 358/1.9 |
| 6,129,457 A * | 10/2000 | Thompson et al. | ............. | 358/1.2 |
| 7,149,369 B2 * | 12/2006 | Atkins | .......................... | 382/299 |
| 7,254,282 B2 * | 8/2007 | Sathyanarayana | ............ | 382/300 |
| 7,876,971 B2 * | 1/2011 | Gardella et al. | .............. | 382/254 |

FOREIGN PATENT DOCUMENTS

| | | |
|---|---|---|
| JP | 5-40825 | 2/1993 |
| JP | 5-219360 | 8/1993 |
| JP | 2006-270767 | 10/2006 |

OTHER PUBLICATIONS

Machine Translation of Japanese Publication No. 2006-270767 by Yozo.*

* cited by examiner

*Primary Examiner* — Bhavesh Mehta
*Assistant Examiner* — Utpal Shah
(74) *Attorney, Agent, or Firm* — Squire Sanders (US) LLP

(57) ABSTRACT

A resolution converting method for converting a resolution of a binary image to an integral multiple resolution, includes: representing a density of an arbitrary position of the input image as an interpolation value; overlapping the output image on the input image in a setting that a pixel of an edge section of the output image is shifted by a minutely small quantity from a pixel position of the input image in a horizontal direction and a vertical direction; and allotting an area of a pixel to each pixel of an output image which overlaps an area of the input image, integrating interpolation values of the area of the input image, normalizing an value obtained by the integrating the area of the pixel, and determining a binary data.

6 Claims, 18 Drawing Sheets

○ INPUT IMAGE PIXEL POSITION

● OUTPUT IMAGE PIXEL POSITION

RESOLUTION CONVERTING METHOD

RELATED APPLICATION

This application is based on Japanese Patent Application No. 2008-183096 filed on Jul. 14, 2008 in Japanese Patent Office, the entire content of which is hereby incorporated by reference.

FIELD OF THE INVENTION

The present invention relates to a resolution converting method, which converts resolution of a binary image of a dot-matrix form.

BACKGROUND OF THE INVENTION

In resolution conversion of an image, a linear interpolation method (for example, refer to Japanese Patent Application Publication No. H5-219360) and an area average method (for example, refer to Japanese Patent Application Publication No. H5-40825 and Japanese Patent Application Publication No. 2006-270767) are generally applied to the resolution conversion of an image. In the case of a binary image, after resolution conversion, further, a binarization process will be performed by comparing a density of each pixel with a threshold.

FIG. 9 illustrates an appropriate range to which a linear interpolation method and an area average method can be applied.

Although an interpolation method, such as a linear interpolation method, is applied to a high resolution process (expansion) and a minor low resolution process (reduction), there is a problem that a jaggy becomes remarkable when applying a large low resolution processing, such as a fraction of a full size image. Therefore, only when a low resolution processing is performed, the area average method is applied in many cases. On the other hand, although the area average method is advantageous to the low resolution process, smoothing of edge (smoothing) using a high resolution effectively in the high resolution process becomes insufficient.

Then, it will be feasible to create a method for multi-valuing an original binary image by the linear interpolation once, and performing the area average to the result; (interpolation+area average) method. By this method, it becomes possible to complement the both problems, and to obtain a high-definition resolution converted image in some extent regardless of the resolution conversion magnification from a high resolution process to a low resolution process.

FIG. 10 illustrates a flow of a resolution conversion process of a binary image by the (interpolation+area average) method. First, a density at an arbitrary position between pixels (interpolation value) of an inputted binary image of dot-matrix form is obtained and multi-valued with a linear interpolation method (STEP S301).

Next, the density of each pixel of an output image is obtained by re-sampling which uses the area average method (STEP S302). For example, as illustrated in FIG. 11, an input image 311 and an output image 312 after resolution conversion are overlapped so that the coordinates of the pixels of four corners, which are located outsides, are matched. The entire area of the output image 312 is equally divided into areas by the number of pixels of the output image, and a pixel area G is assigned against each pixel of the output image. Then, integration of the interpolation value with respect to the area of the input image which overlaps with the pixel area is preformed with respect to each pixel area G, and the density value of the pixel corresponding to the pixel area is determined by normalizing this integral value by the area of the pixel area. Then, each pixel is binarized by comparing this density value with a predetermined threshold (STEP S303). Here, the center position of the pixel area G is to be the coordinates (an area representation coordinates; a pixel position) representing the pixel area G.

There can be considered some methods for overlapping the input image and the output image in the re-sampling of above-mentioned STEP S302. In the case of the methods of overlapping shown in Example 1 illustrated in FIG. 11, as illustrated in FIG. 12, the correspondence relation of the pixel area of the input image and the output image will be established so that the outside coordinates of the pixels of four corners are matched. A white circle in FIG. 12 denotes the position of each pixel (input pixel) of the input image and a rectangle of a dashed line surrounding each white circle denotes a pixel area (an input pixel area) of the input pixel. A circle onto which hatching has been performed denotes the position of each pixel of the output image (output pixel) and a rectangle of a dot-dashed line surrounding the circle onto which hatching has been applied denotes the pixel area of the output pixel (output pixel area).

When a high resolution process of an integral multiple is performed by setting up such pixel areas, a plurality of pixels, which are equally influenced by the value of a specific pixel of the input image, will be generated. For example, in a two-time (double) expansion, as illustrated in FIG. 13, four output pixels (gray small circles) in the circumference of a black input pixel B become black, which is strongly influenced by the black input pixel B of the center. Four output pixels in the circumference of a white input pixel W become white, which is strongly influenced by the input pixel W of white of the center. Thus, since one original pixel is only expressed with 4 pixels, as shown in FIG. 14, the edge of a slanting line is not smoothed (smoothing). Thus, it is difficult to obtain an effect of the high resolution process.

FIG. 15 illustrates another method of overlapping (Example 2). In Example 2, four corners of an entire image area are set up in the center of pixels located in four corners. That is, the input image and the output image are arranged to be overlapped so that the pixel position of the pixels of four corners of the input image 311 and the pixels of four corners of the output image 312 are respectively matched.

In this case,

To set up a pixel area (which is defined by the coordinate areas in the horizontal direction and the vertical corresponding to a square area, which each pixel occupies.

To set a coordinate area No. k in the range of coordinate value k of −0.5~k+0.5.

A represent coordinates of the coordinate-area No. k is to be set to "k" which is the center of a coordinate area.

The image area is to be a square area whose peak is to be the center of the pixels of four corners.

The output image is treated the same as the input image.

In the case of Example 2, with respect to the correspondence between the pixel of the input image and the output image, the centers of the pixels of four corners of the input image and the output image are matched respectively as shown in FIG. 16. When the high resolution process of an integral multiple is performed based on the setup of such a pixel area, in the case of binarization, many pixels matching a threshold occurs. Therefore, unstable output pixels are generated in the edge portions, and the phenomenon in which a slanting narrow line becomes thick excessively or becomes thin occurs as shown in FIG. 17. FIG. 17 illustrates an example of high resolution process of 200%.

FIG. 18 illustrates details of a case where high resolution process of 200% is performed based on the setup in Example 2. A white circle in FIG. 18 shows a white pixel of the input image, and a black dot shows a black pixel of the input image. A gray small circle is an output pixel and a rectangle of a dotted line surrounding the output pixel shows a pixel area (integral area) related to the output pixel. Since the integral value of the interpolation value of the pixel area to which a slash has not been given is greatly influenced by the input pixel which exists in the center of the pixel area in FIG. 18, when there is a white input pixel in the center, the pixel area is set white, and when there is a black input pixel, the pixel area is set black so that the pixel are will be stably binarized.

On the other hand, the integral value of the pixel area to which slashed lines are given does not dependent on a specific input pixel, and is influenced almost equally by the surrounding input pixel (for example, when a pixel area 331 is equally influenced by a black input pixel 332 and a white input pixel 333, when being seen in the vertical direction). Therefore, the density, which is obtained by normalizing the integral value becomes easily tend to be near the threshold, and when binarizing, it becomes unstable to become a white pixel or to become a black pixel. As shown in FIG. 17, the phenomenon in which thickness of a slanting line becomes thick excessively, or becomes thin will arise.

An object of the present invention is to provide a resolution converting method, which can obtain a smooth slanting edge and can reproduce a narrow line stably with thickness corresponding to the original thickness when performing a high-resolution process to a binary image of a dot-matrix form, and to solve the above-mentioned problem.

SUMMARY OF THE INVENTION

One aspect of the present invention is to provide a resolution converting method for converting an input image having a binary image of a dot-matrix form into an output image having a binary image represented in a dot-matrix form having a resolution equal to an integral multiple of a resolution of the input image, the resolution converting method having:

representing a density at an arbitrary position residing between pixels of the input image as an interpolating value obtained by interpolating vicinity pixels in the input image;

allotting an area of a pixel of each pixel of the output image to the pixel, in a state of overlapping an area of the output image after a resolution conversion processing is completed, on an area of the input image, in a setting that the area of the output image is shifted from the area of the input image by a minutely small quantity in a horizontal direction and a vertical direction;

integrating interpolated values of an area of the input image which overlaps with the area of the pixel of each pixel of the output image;

normalizing an value obtained by the integrating with respect to the area of the pixel; and determining a binary data of the pixel by comparing small and large between the value obtained by the normalizing and a predetermined value.

DESCRIPTION OF THE PREFERRED EMBODIMENT

Hereafter, an embodiment of the invention will be described based on drawings.

Figure 1:
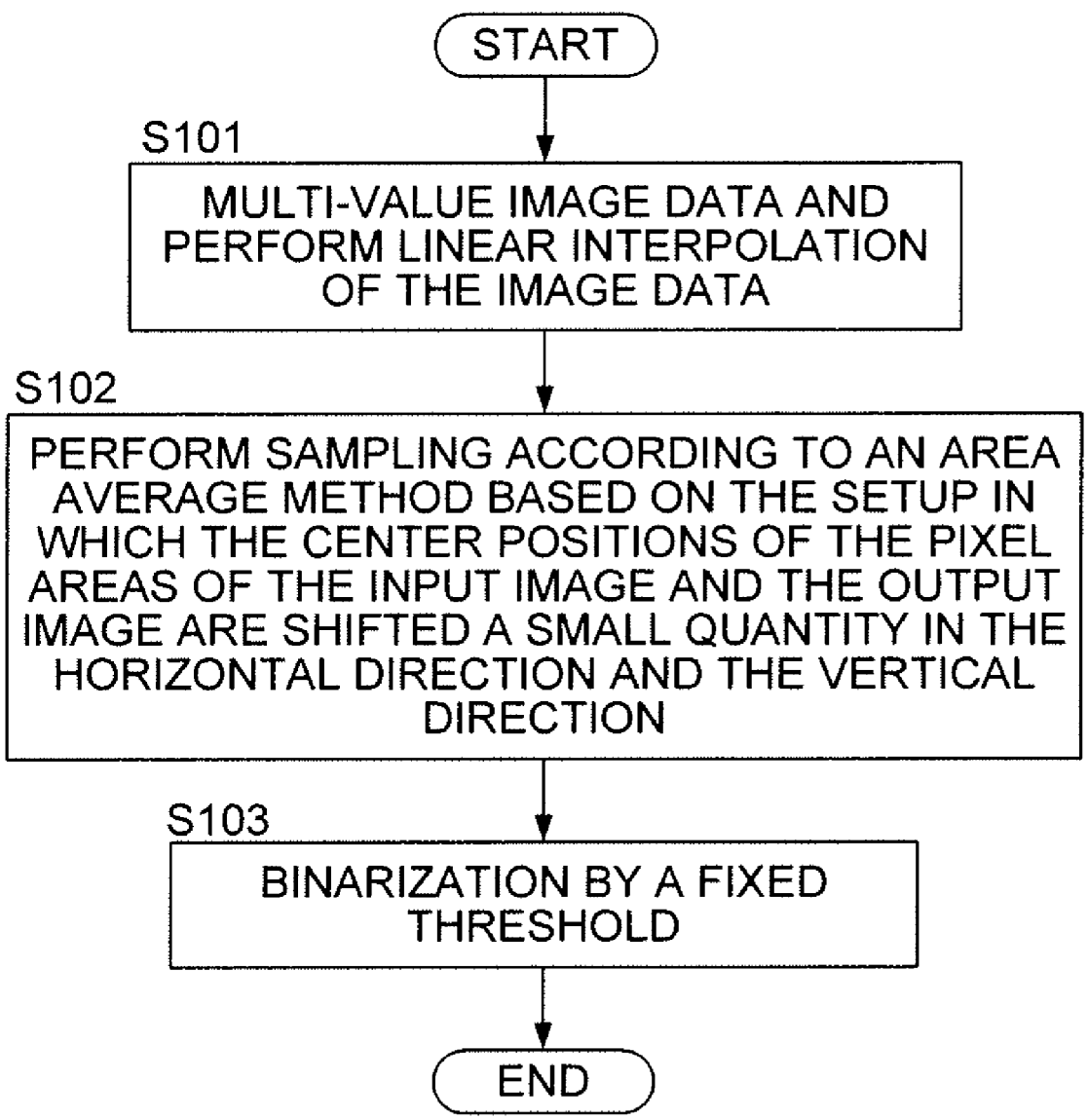
FIG. 1 is a flow chart illustrating the outline of the whole processing of the resolution converting method related to an embodiment of the present invention.
Figure 10:
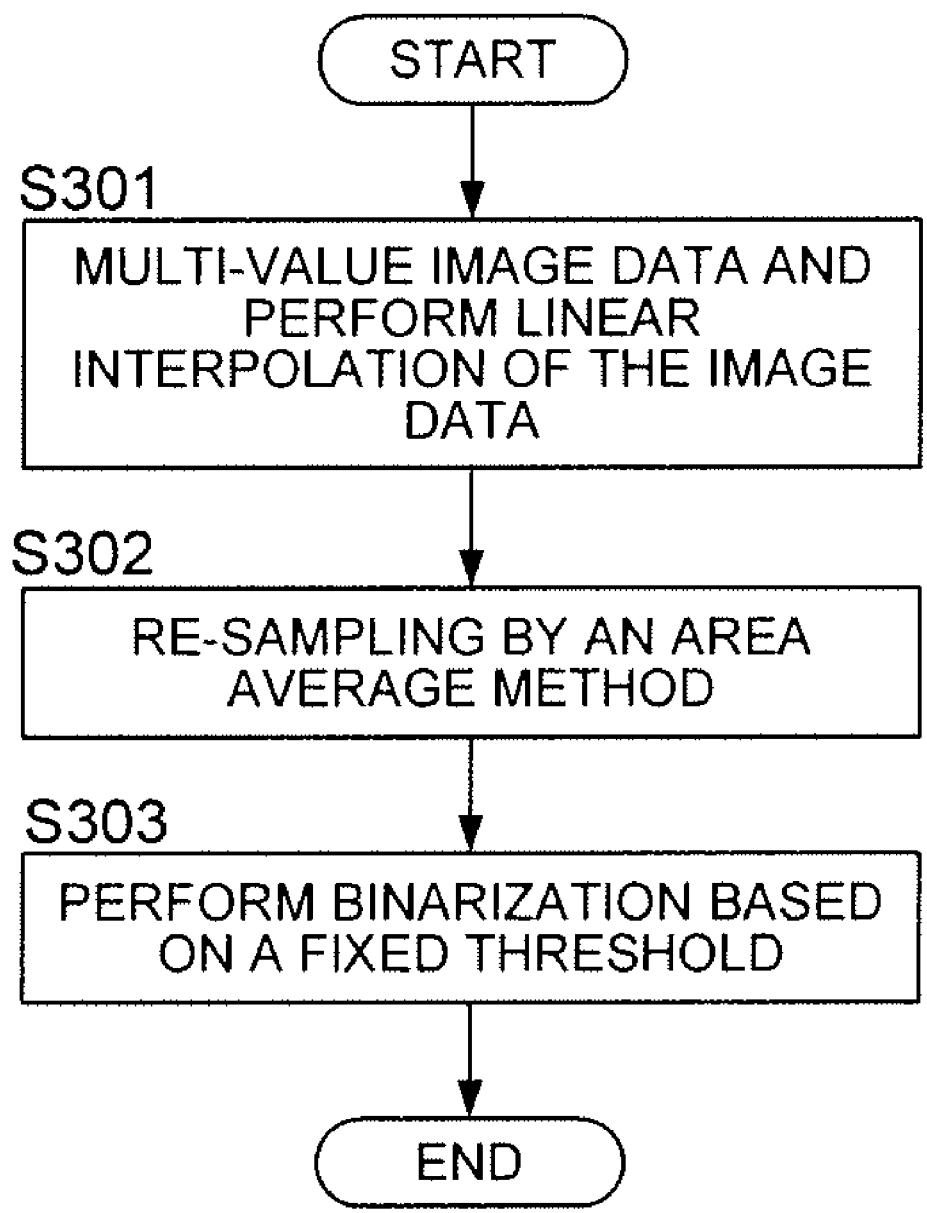
FIG. 10 is a flow chart illustrating the outline of the resolution conversion process of the binary image based on the (interpolation+area average) method.
Figure 11:
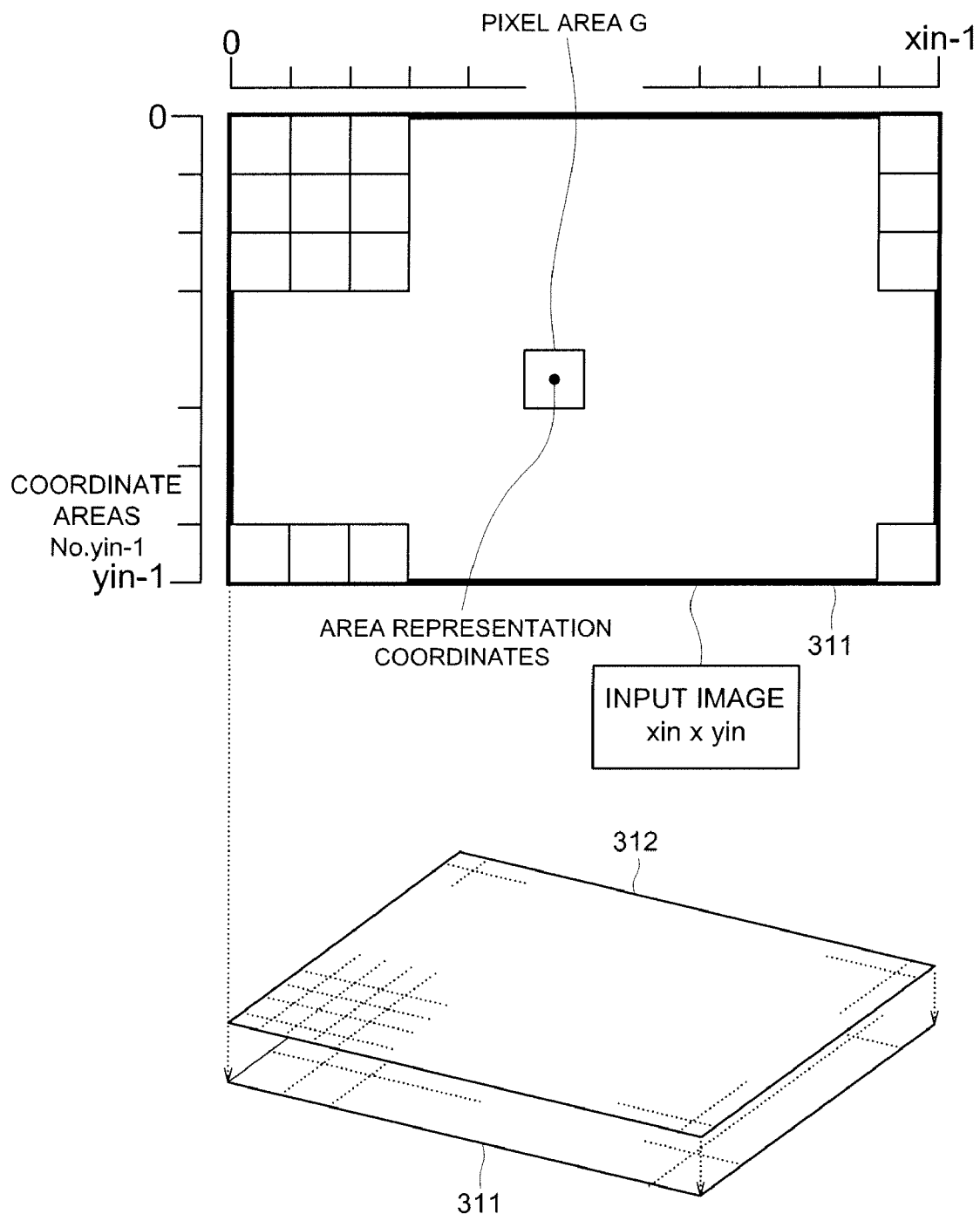
FIG. 11 is an explanatory view illustrating the physical relationship of the image and coordinates at the time of overlapping the input image and the output image so that the coordinates of the outside of the pixels of four corners are matched.
Figure 12:
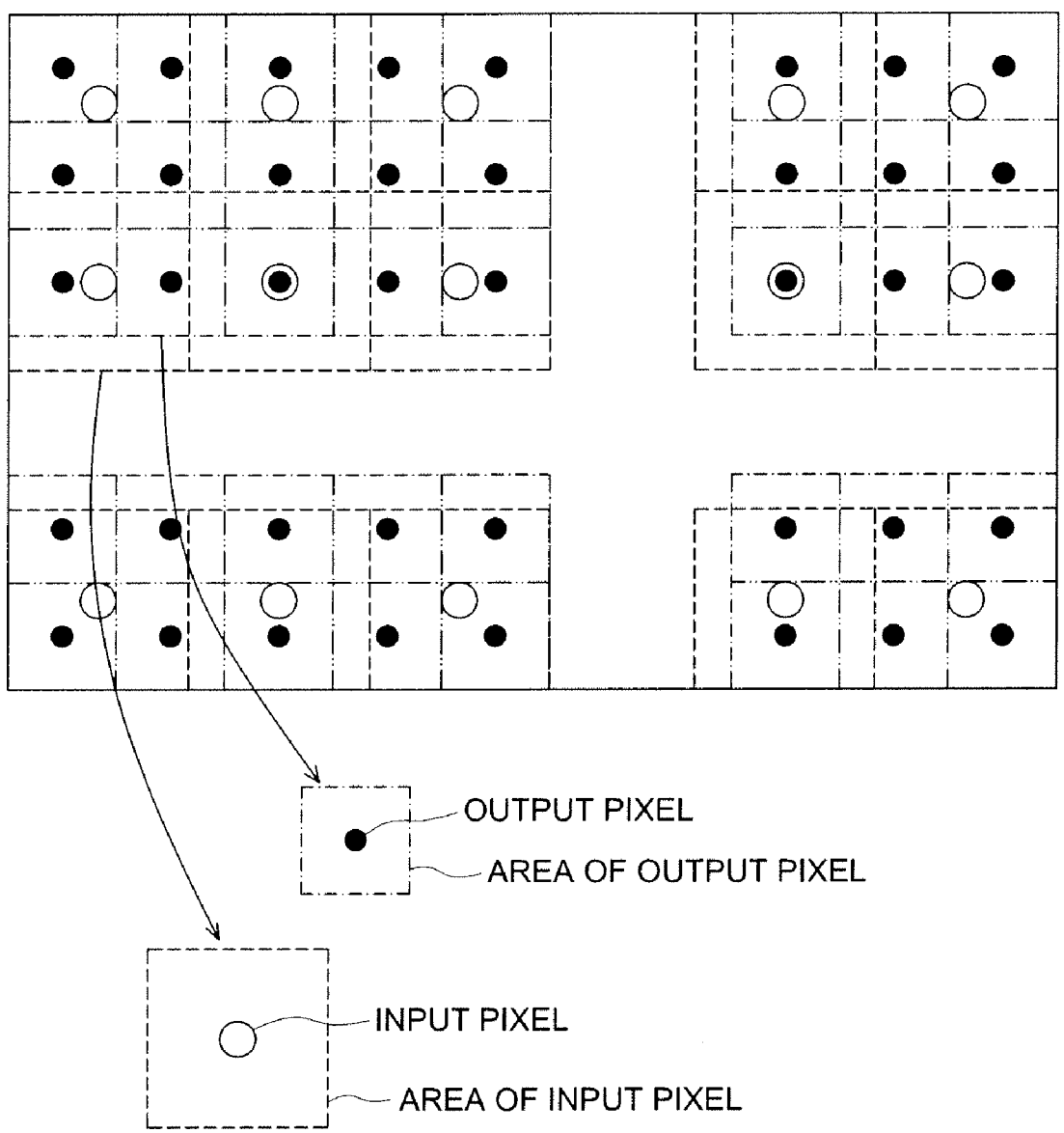
FIG. 12 is an explanatory view illustrating an example in the state where the input image and the output image have been overlapped so that the coordinates of the outside of the pixel of four corners are matched.
Figure 13:
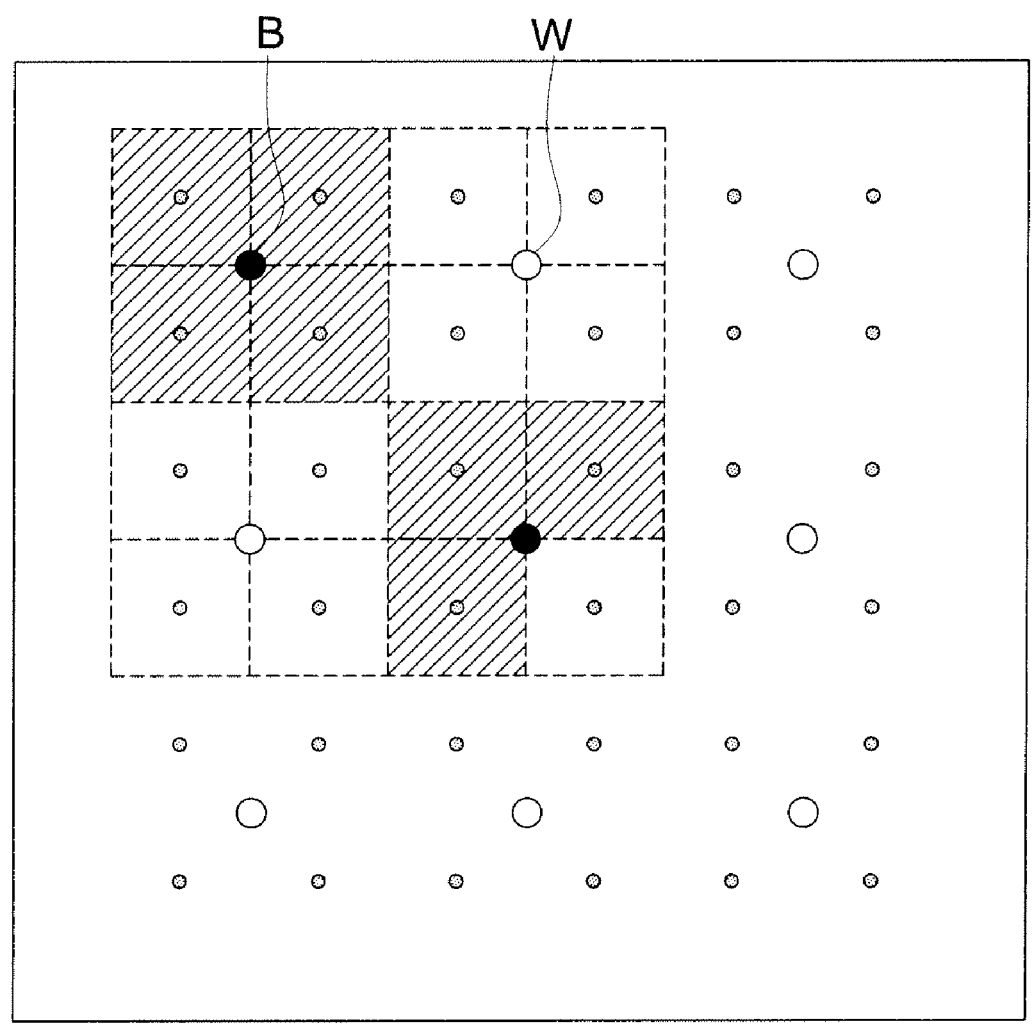
FIG. 13 is an explanatory view illustrating the state of the input-and-output pixel at the time of performing expansion of 200% under the condition that the input image and the output image are overlapped so that the coordinates of the outside of the pixel of four corners are matched.
Figure 14:
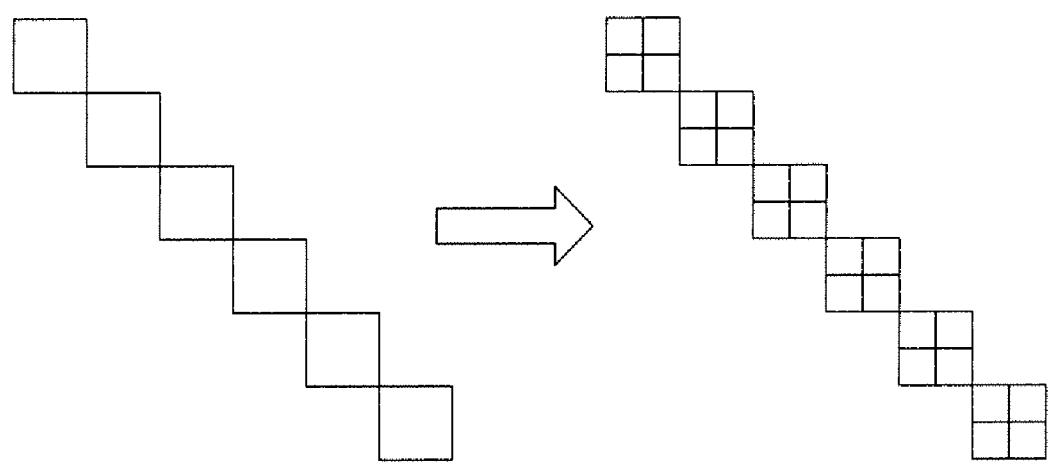
FIG. 14 is an explanatory view illustrating the case where expanding a slanting line to two-time resolution based on the setup in which the input image and the output image are overlapped so that the coordinates of the outside of the pixel of four corners are matched.
Figure 15:
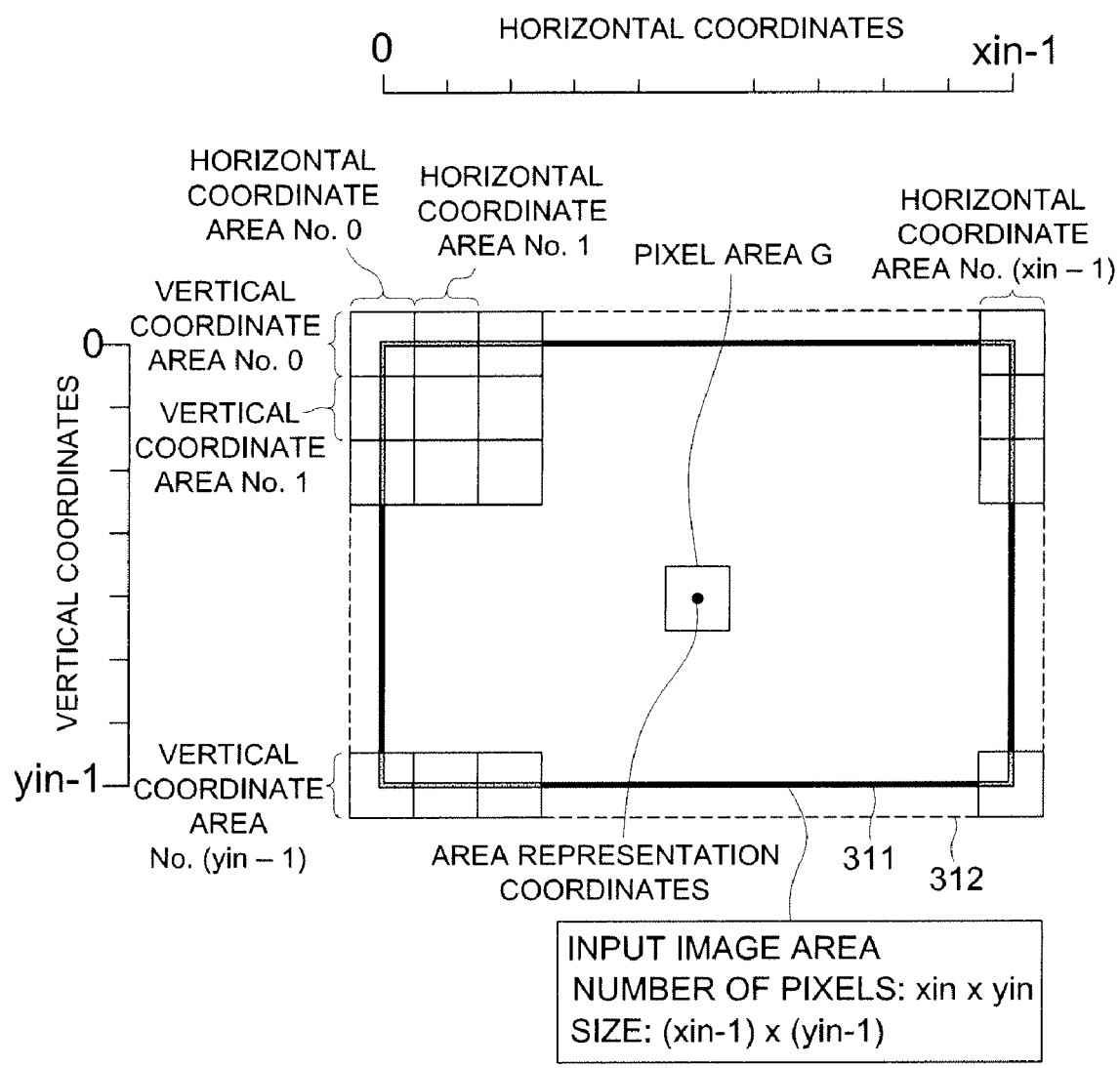
FIG. 15 is an explanatory view illustrating a physical relationship of the image and coordinates at the time of overlapping the input image and the output image so that the pixels of the four corners of the input image and the pixels of the four corners of the output image are coincided.
Figure 16:
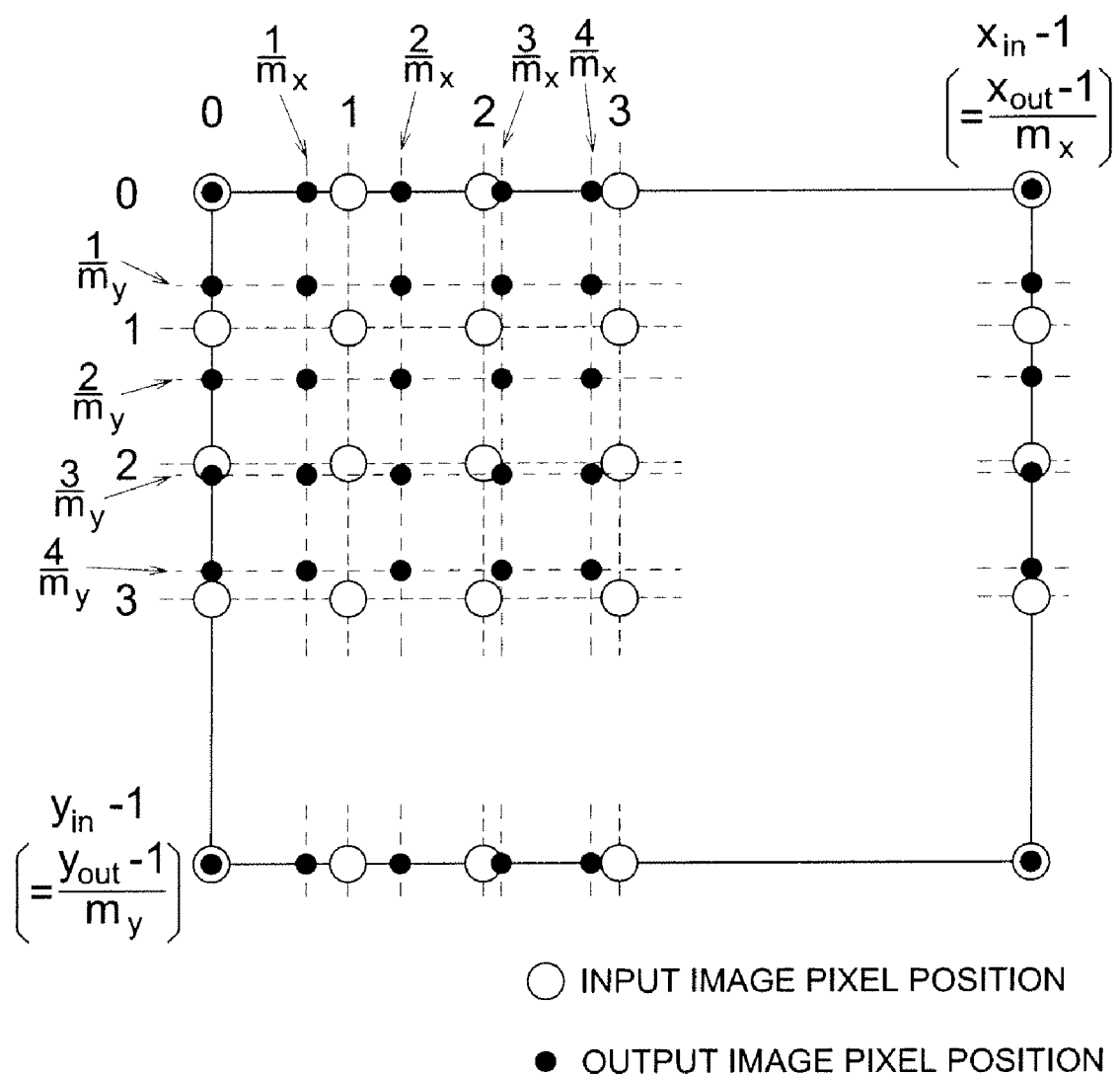
FIG. 16 is an explanatory view illustrating an example in the state where the input image and the output image have been overlapped so that the pixels of the four corners of an input image and the pixels of the four corners of an output image are coincided.
Figure 17:
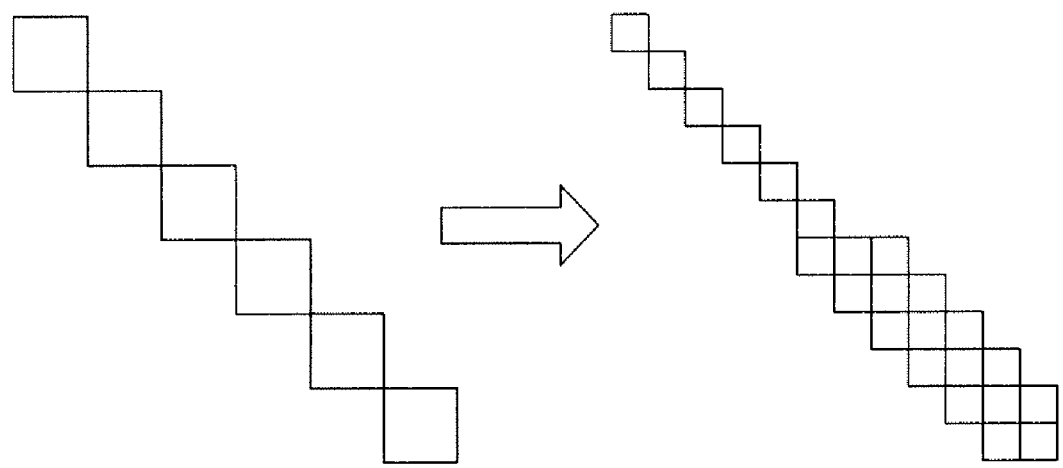
FIG. 17 is the explanatory view illustrating the case where a slanting line has been expanded to two-time resolution based on the setup in which the pixels of the four corners of the input image and the pixels of the four corners of the output image are to be coincided.

FIG. 1 illustrates a flow of the outline of the whole processing of the resolution converting method related to an embodiment of the invention and, at the same time, illustrates a flow of the outline of a processing related to the embodiment of the invention executed by an image processing apparatus including an image processing section or a computer readable storage medium storing a computer executable program. Although the flow of the processing shown in FIG. 1 is fundamentally the same as FIG. 10, which has been explained in the background art, the physical relationship at the time of overlapping an input image and an output image differs.

First, the density in an arbitrary position between the pixels of the input image having a binary image of a dot-matrix form, which has been inputted (interpolation value), is obtained and multi-valued by using a linear interpolation method (STEP S101). Next, the density of each pixel of an output image is obtained by re-sampling which uses an area average method (STEP S102). At this time, the input image and the output image are overlapped (matched) based on the setup in which the center position of the pixel areas of the four corners of the input image and the output image of after resolution conversion are shifted a small quantity in the horizontal direction and the vertical, and re-sampling based on an area average method is performed (STEP S102). Then, each pixel is binarized based on the comparison between the density value of each pixel of the output image determined by this re-sampling and a predetermined threshold (STEP S103).

Next, the linear interpolation of the above-mentioned processing and the re-sampling will be explained in detail.

Figure 2:
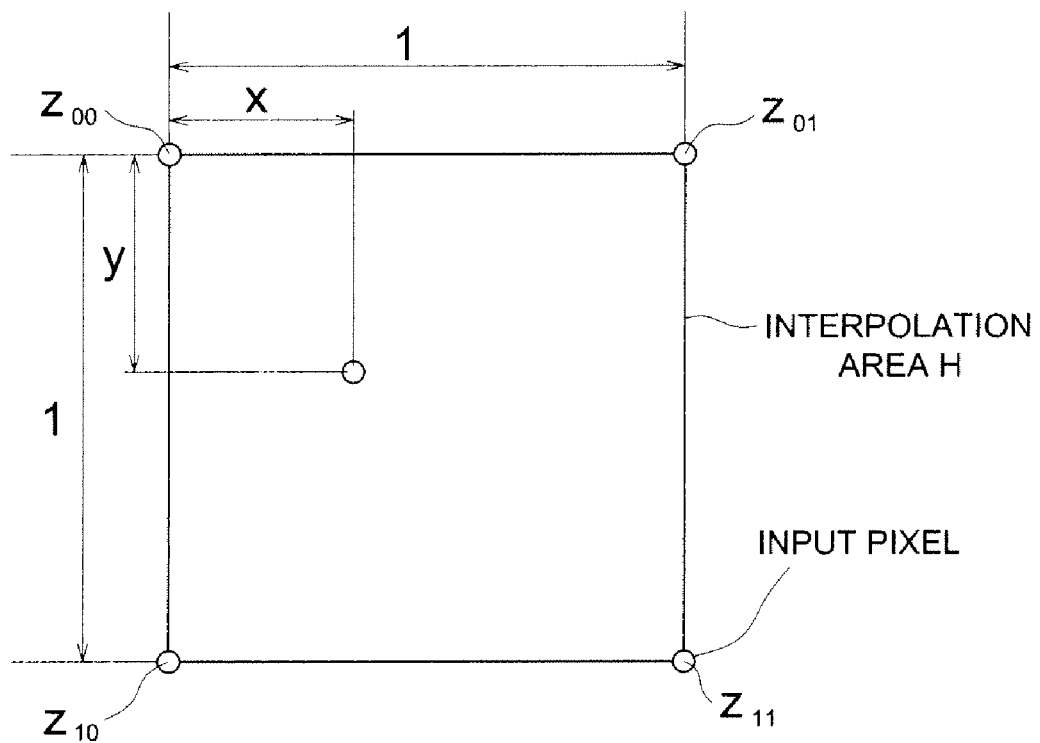
FIG. 2 is an explanatory view illustrating an interpolation area.

First, the linear interpolation of STEP S101 is performed based on that the rectangle area having vertices adjoining 4 pixels (four input pixels) of an input image is assumed to be an interpolation area. The interpolation area H is expressed with the scale, which sets the pitch of the input pixel a unit size as a square of 1×1, as illustrated in FIG. 2.

An interpolation value z in the relative coordinates (x, y) in the interpolation area sets the data value of the input pixel to $z_{00}$, $z_{01}$, $z_{10}$ and $z_{11}$, and is expressed with the following formulas.

$$z=(1-x)(1-y)z_{00}+x(1-y)z_{01}+(1-x)yz_{10}+xyz_{11} \quad (1)$$

$0 \leq x, y \leq 1$ $z_{00}, z_{01}, z_{10}, z_{11}=$ '0' or '1'

Figure 3:
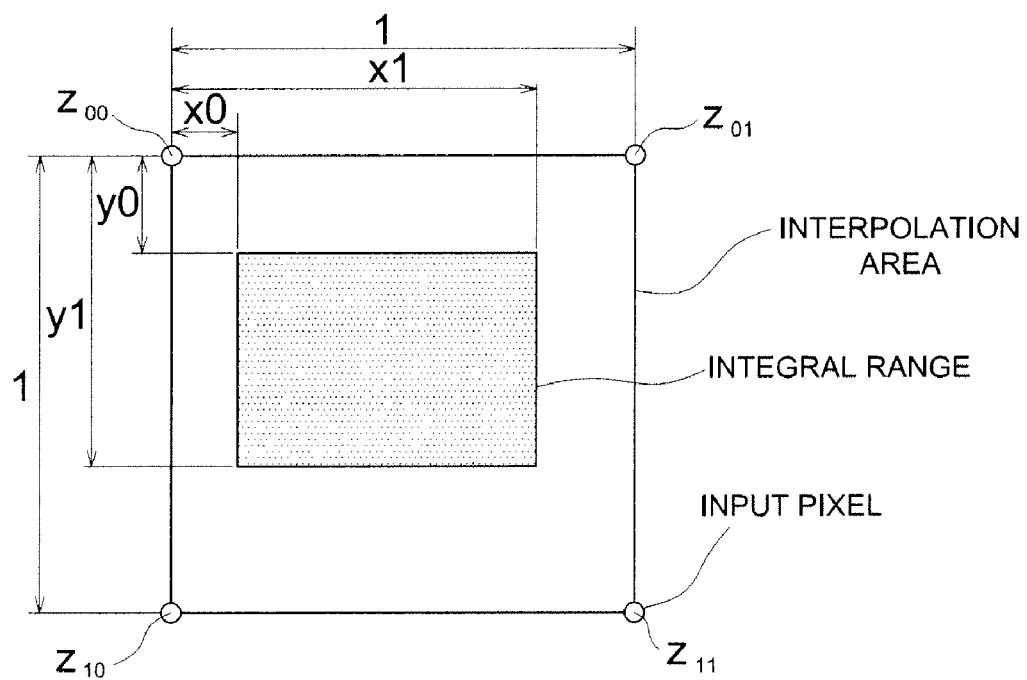
FIG. 3 is an explanatory view illustrating an example of the integral range in an interpolation area.

The integral value of the interpolation value on an arbitrary rectangle area (an integration area, refer to FIG. 3) inside the interpolation area is expressed with the following formulas.

$$\int_{y_0}^{y_1}\int_{x_0}^{x_1} z = \left[(x_1-x_0)(y_1-y_0)\left\{\begin{array}{l}\frac{(z_{00}-z_{01}-z_{10}+z_{11})(x_0+x_1)(y_0+y_1)}{4}+\\ \frac{(z_{10}-z_{00})(y_0+y_1)}{2}+\\ \frac{(z_{01}-z_{00})(x_0+x_1)}{2}+z_{00}\end{array}\right\}\right] \quad (2)$$

when $x_0=0$, $x_1=1$, $y_0=0$ and $y_1=1$, $(z_{00}+z_{01}+z_{10}+z_{11})/4$

Figure 4:
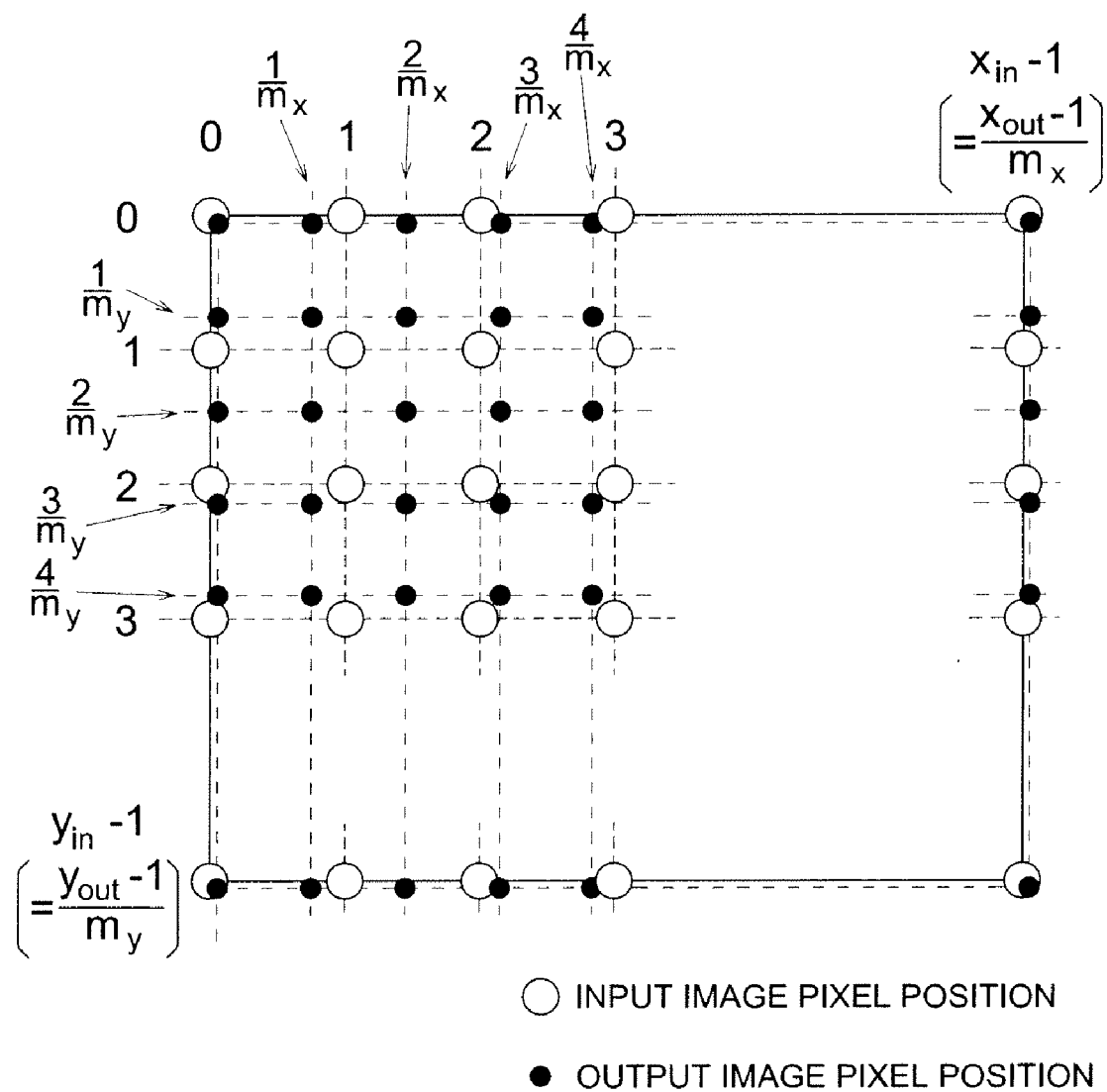
FIG. 4 is an explanatory view illustrating an example in the state where the input image and the output image are overlapped based on the setup in which the center positions of the pixel areas of the four corners of an input image and the output image of after resolution conversion are shifted by a minutely small quantity in the horizontal direction and the vertical direction.

FIG. 4 illustrates an example in the state where the input image and the output image are overlapped based on the setup in which the center positions of the pixel areas of the four corners of an input image and the output image of after resolution conversion are shifted a small quantity in the horizontal direction and the vertical direction.

In order to maintain the correspondence relation of the four corners of the input image and the output image, it is not preferred that the quantity of shift is excessively large. With respect to the maximum quantity of shift, on the basis that the pixels to which the pixels of four corners of the input image have been mainly reflected, are to be leave, the maximum quantity of shift is to be less than ½ of the pitch of the output pixel or less than 1/(2m) of the pitch of the output pixel, where "m" denotes a magnification factor (less than 0.25 pixel when performing two-time expansion, and less than 0.125 pixel when performing 4-time expansion). In the system in which the maximum expansion is about 4 times, it is enough that the quantity of shift is set not more than 0.1 pixels. It is not necessary to particularly consider the minimum quantity of shift. What is necessary is just to have been shifted, even it is a small quantity.

Next, the relation between the pixel area of the output image (output pixel area) and the pixel area of the input image (input pixel area) at the time of expansion (high resolution process) and reduction (low resolution process) will be illustrated respectively, and will be explained.

Figure 5:
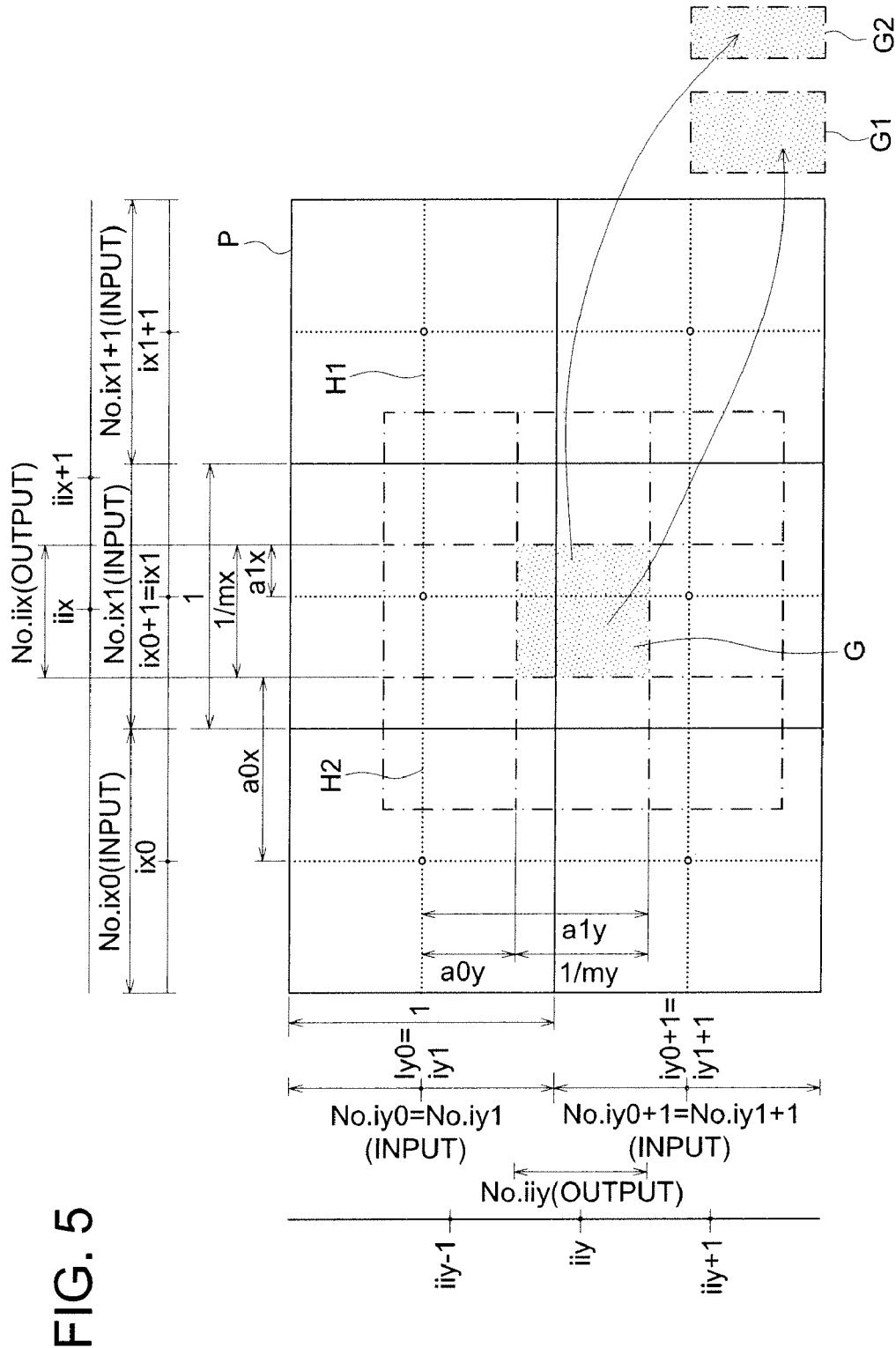
FIG. 5 is an explanatory view illustrating the relation between the pixel area of the output image and the pixel area of the input image at the time of expansion.

FIG. 5 shows an example at the time of expansion. FIG. 5 illustrates the vicinity of the specific pixel (iix, iiy) of the output image in the state where the input image and the output image have been overlapped based on the setup in which the center positions of the pixel areas of the four corners of the input image and the output image are shifted a small quantity in the horizontal direction and the vertical direction by an appropriate scaling operation. The dimension of the drawing in FIG. 5 is set with an input pixel pitch standard (input pixel pitch=1).

Each rectangle shown with the solid line in FIG. 5 is a pixel area of the input pixel (input pixel area P). The small white circle, which exists at the center of each input pixel area P expresses the coordinates (representation coordinates of the input pixel area) of the input pixel. It is considered that pixel data is a value in this coordinates/position. Each square area, which encloses four adjoining input pixels as its vertices, the square area being enclosed by a dotted line, becomes one interpolation area.

A pixel area G of an output pixel (output pixel area) (iix, iiy) is an area smeared away by small points, which is enclosed with a dash-dotted line in FIG. 5. The pixel area G of the output pixel (iix, iiy) in FIG. 5 is straddling interpolation areas H1 and H2. The integration of the interpolation value in the pixel area of output pixel (iix, iiy) is divided into an area G1 in interpolation area H1, and an area G2 in interpolation area H2, and integrations are performed respectively. The integral value of the interpolation value in the pixel area of an output pixel (iix, iiy) is calculated as those sums. The output pixel area straddles 1, 2, or 4 interpolation areas depending on the potion of the output pixel area.

Figure 6:
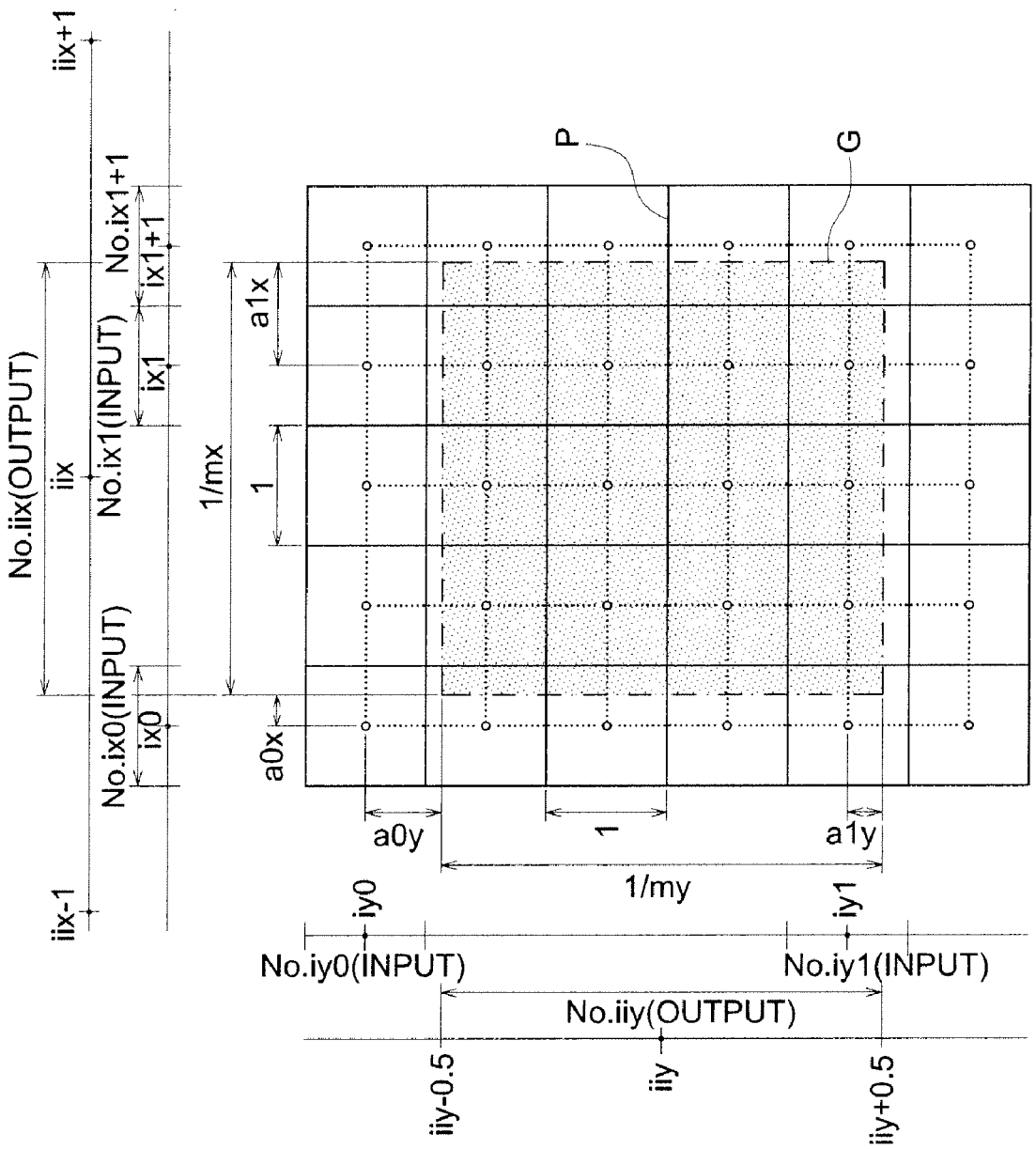
FIG. 6 is an explanatory view illustrating the relation between the pixel area of the output image and the pixel area of the input image at the time of reduction.

FIG. 6 illustrates an example at the time of reduction. FIG. 6 illustrates the vicinity of the specific pixel (iix, iiy) of the output image in the state where the input image and the output image are overlapped based on the setup in which the center position of the pixel areas of the four corners of the input image and the output image are shifted a small quantity in the horizontal direction and in the vertical direction by an appropriate scaling operation. The dimension of FIG. 6 is an input pixel pitch standard (input pixel pitch=1).

The large number of rectangles shown in a solid line in FIG. 6 are pixel areas P of an input pixel (input pixel area), and the small white circles which exist at the center of each input pixel area P express the coordinates (representation coordinates of the input pixel area) of the input pixel. It is considered that pixel data is a value in this coordinates/position. Each square area, which encloses four adjoining input pixels as its peaks, the square area being enclosed by a dotted line, becomes one interpolation area.

The pixel area G of the output pixel (iix, iiy) (output pixel area) is an area smeared away by small points enclosed with a dash-dotted line in FIG. 6. The output pixel area is straddling 20 interpolation areas, and the integral value of the interpolation value in the output pixel area is calculated as the sum of the integral value for each interpolation area.

Figure 7:
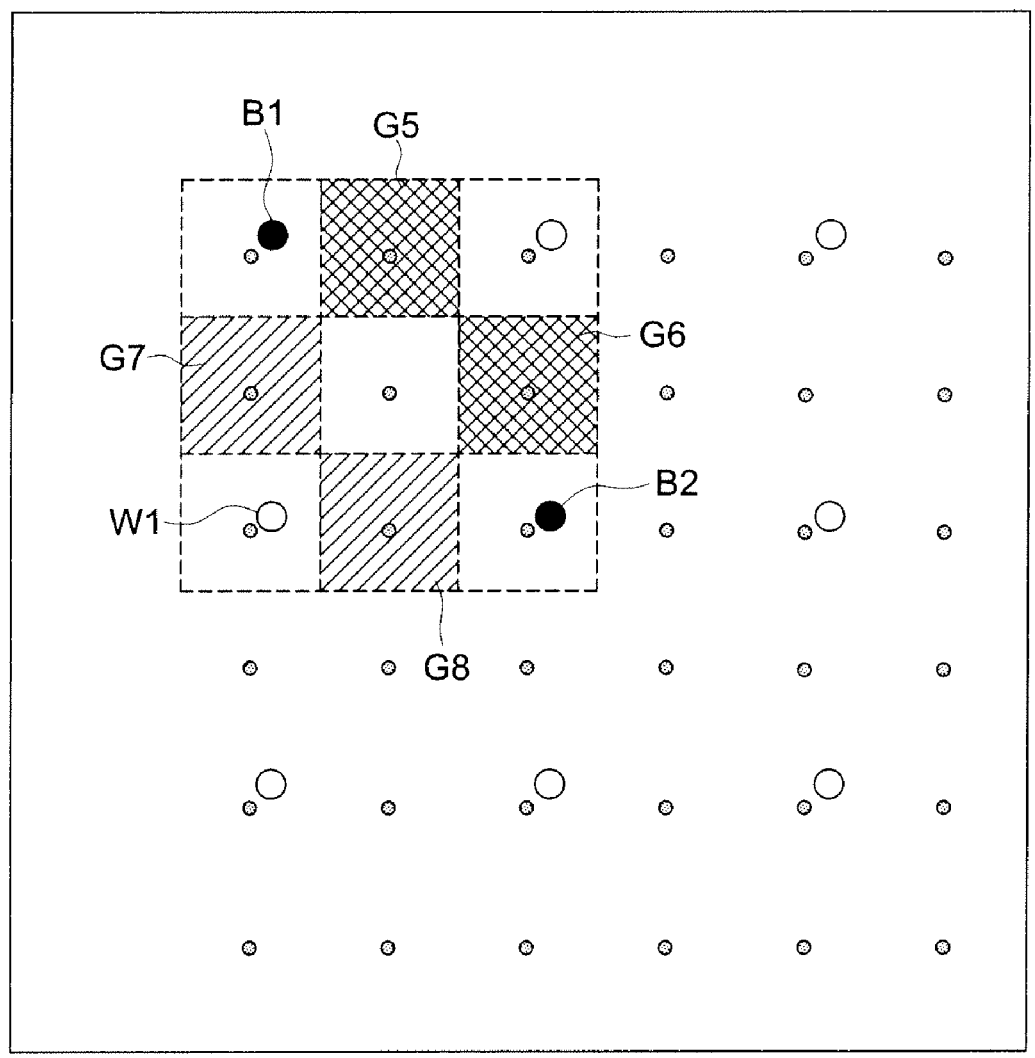
FIG. 7 is an explanatory view illustrating the relation between the input pixel and the output pixel and output pixel area at the time of performing a two-time expansion based on the setup in which the center positions of the pixel areas of the four corners of the input image and the output image of after resolution conversion are shifted by a minutely small quantity in the horizontal direction and the vertical direction.
Figure 18:
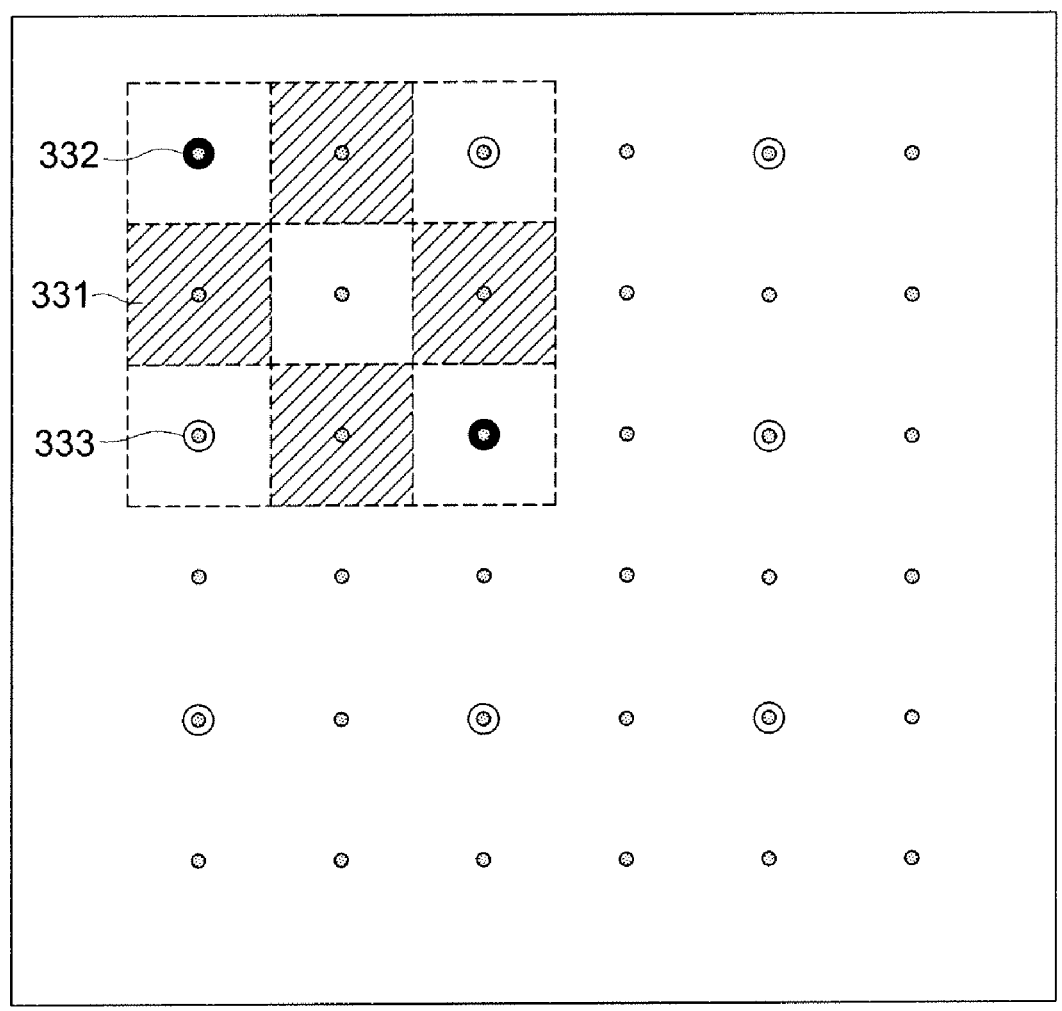
FIG. 18 is the explanatory view illustrating the relation between the input pixel and the output pixel and output pixel area at the time of performing two-time expansion based on the setup in which the pixels of the four corners of the input image and the pixels of the four corners of the output image are to be coincided.

FIG. 7 illustrates the case where two-time expansion is performed based on the setup in which the center position of the pixel areas of the four corners of the input image and the output image of after resolution conversion are shifted a small quantity in the horizontal direction and vertical direction. The drawing in FIG. 7 has been illustrated so that FIG. 7 is contrasted with the setup in which a small quantity shift is not performed as shown in FIG. 18. Since in the case of FIG. 18, the integral value of the pixel area where the slash has been given does not depend on the specific input pixel and the integral value of the pixel area is influenced almost equally by the surrounding input pixels, the density obtained by normalizing the integral value becomes easily near the threshold. As a result, whether the pixel area becomes a white pixel, or a black pixel has been unstable. However, by performing a small quantity shift as illustrated in FIG. 7, the pixel areas G5 and G6 come to receive the inference of black input pixels B1 and B2 more strongly and become a black pixels when being binarized. On the other hand, pixel areas G7 and G8, which were unstable before performing the small quantity shift, become a white pixel, in case where the pixel areas G7 and G8 come to be more strongly influenced by white input pixel W1. Thus, the pixel areas G7 and G8 become white pixels when being binarized.

Figure 8:
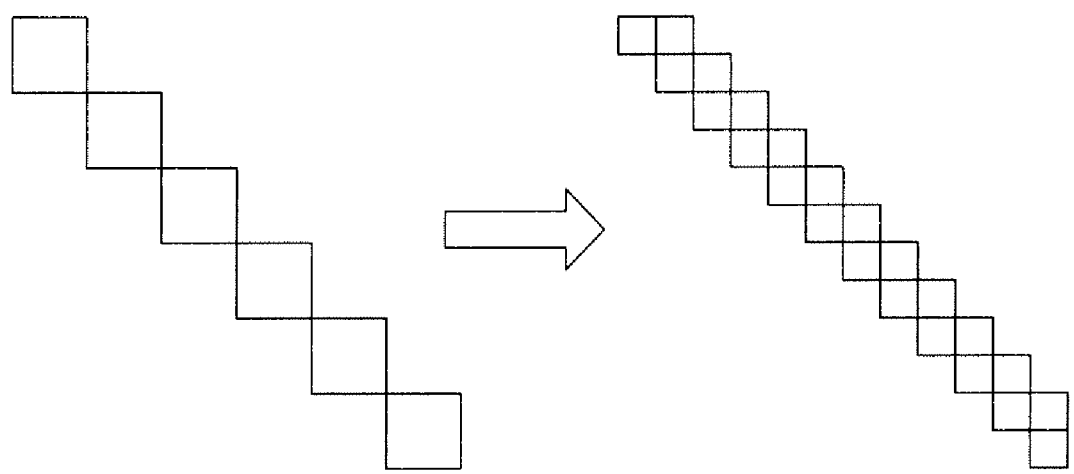
FIG. 8 is the explanatory view illustrating the case where expanding a slanting line to two-time resolution based on the setup in which the center positions of the pixel areas of the four corners of the input image and the output image after resolution conversion are shifted by a minutely small quantity in the horizontal direction and the vertical direction.
Figure 9:
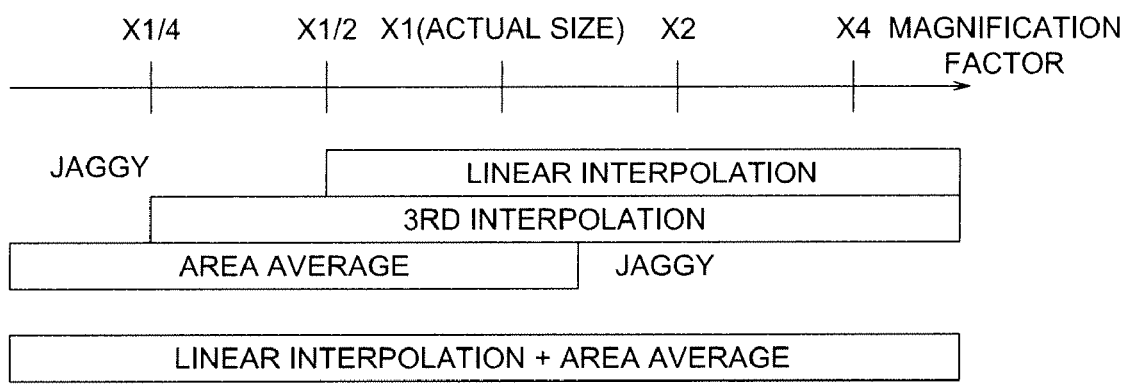
FIG. 9 is an explanatory view illustrating an appropriate range for a linear interpolation method and an area average method.

As a result, in case where a slanting line is expanded to two-time resolution as shown in FIG. 8, smooth slanting edges can be obtained and a narrow line can be stably reproduced with the thickness corresponding to the original thickness. The correspondence relation between the edges of the input image and the output image is also mostly maintained.

As stated above, although the drawings have explained using embodiments of the present invention, a concrete structure is not limited to what was shown in these embodiments, and although there are changes and additions in the range which does not depart from the scope of the present invention, it is included in the present invention.

For example, in the embodiment described above, although the interpolation value is calculated by linear interpolation, the method of calculating the interpolation value is not limited to this, but arbitrary methods may be applied, for example, it may use a cubic convolution.

According to a resolution converting method related to an embodiment of the present invention, when the high resolution process of the binary image of a dot-matrix form is performed, smooth slanting edges can be obtained and a narrow line can be stably reproduced with the thickness corresponding to the original thickness.

What is claimed is:

1. A resolution converting method for converting to expand an input image having a binary image of a dot-matrix form into an output image having a binary image represented in a dot-matrix form having a resolution equal to an integral multiple of a resolution of the input image, the resolution converting method comprising:
representing a density at an arbitrary position residing between pixels of the input image as an interpolating value obtained by interpolating vicinity pixels in the input image;
allotting an area of a pixel of each pixel of the output image to the pixel, in a state of overlapping an area of the output image after a resolution conversion processing is completed, on an area of the input image, in a setting that the area of the output image is shifted from the area of the input image by less than a half of a pitch between output pixels in a horizontal direction and a vertical direction;
integrating interpolated values of with respect to an area of a part of the input image which overlaps with the area of the pixel of each pixel of the output image in the setting that the area of the output image is shifted;
normalizing a value obtained by the integrating with respect to a dimension of the area of the pixel; and
determining a binary data of the pixel by comparing between the value obtained by the normalizing and a predetermined value.

2. A resolution converting method for converting to expand an input image having a binary image of a dot-matrix form into an output image having a binary image represented in a dot-matrix form having a resolution equal to an integral multiple of a resolution of the input image, the resolution converting method comprising:
representing a density at an arbitrary position residing between pixels of the input image as an interpolating value obtained by interpolating vicinity pixels in the input image;
allotting an area of a pixel of each pixel of the output image to the pixel, in a state of overlapping an area of the output image after a resolution conversion processing is completed, on an area of the input image, in a setting that a center of the area of a pixel at an edge section of the output image is shifted by less than a half of a pitch between output pixels from a pixel position of a pixel at an edge of the input image in a horizontal direction and a vertical direction;
integrating interpolated values of an area of a part of the input image which overlaps with the area of the pixel of each pixel of the output image in the setting that the area of the output image is shifted;
normalizing a value obtained by the integrating with respect to a dimension of the area of the pixel; and
determining a binary data of the pixel by comparing between the value obtained by the normalizing and a predetermined value.

3. A non-transitory computer-readable medium storing a computer executable program for implementing an operation for converting to expand an input image having a binary image of a dot-matrix form into an output image having a binary image represented in a dot-matrix form having a resolution equal to an integral multiple of a resolution of the input image, the program being executable by the computer to perform a process comprising:
representing a density at an arbitrary position residing between pixels of the input image as an interpolating value obtained by interpolating vicinity pixels in the input image;
allotting an area of a pixel of each pixel of the output image to the pixel, in a state of overlapping an area of the output image after a resolution conversion processing is completed, on an area of the input image, in a setting that the area of the output image is shifted from the area of the input image by less than a half of a pitch between output pixels in a horizontal direction and a vertical direction;
integrating interpolated value of an area of a part of the input image which overlaps with the area of the pixel of each pixel of the output image in the setting that the area of the output image is shifted;
normalizing a value obtained by the integrating with respect to a dimension of the area of the pixel; and determining a binary data of the pixel by comparing between the value obtained by the normalizing and a predetermined value.

4. A non-transitory computer-readable medium storing a computer executable program for implementing an operation for converting to expand an input image having a binary image of a dot-matrix form into an output image having a binary image represented in a dot-matrix form having a resolution equal to an integral multiple of a resolution of the input image, the program being executable by the computer to perform a process comprising:

representing a density at an arbitrary position residing between pixels of the input image as an interpolating value obtained by interpolating vicinity pixels in the input image;

allotting an area of a pixel of each pixel of the output image to the pixel, in a state of overlapping an area of the output image after a resolution conversion processing is completed, on an area of the input image, in a setting that a center of the area of a pixel at an edge section of the output image is shifted by less than a half of a pitch between output pixels from a pixel position of a pixel at an edge of the input image in a horizontal direction and a vertical direction;

integrating interpolated values with respect to an area of a part of the input image which overlaps with a dimension of the area of the pixel of each pixel of the output image in the setting that the area of the output image is shifted;

normalizing a value obtained by the integrating with respect to a dimension of the area of the pixel; and determining a binary data of the pixel by comparing between the value obtained by the normalizing and a predetermined value.

5. An image processing device comprising an image processing section which converts to expand an input image having a binary image of a dot-matrix form into an output image having a binary image represented in a dot-matrix form having a resolution equal to an integral multiple of a resolution of the input image, wherein the image processing section represents a density at an arbitrary position residing between pixels of the input image as an interpolating value obtained by interpolating vicinity pixels in the input image;

allots an area of a pixel of each pixel of the output image to the pixel, in a state of the overlapping an area of the output image after a resolution conversion processing is completed, on an area of the input image, in a setting that the area of the output image is shifted from the area of the input image by less than a half of a pitch between output pixels in a horizontal direction and a vertical direction;

integrates interpolated values with respect to apart of an area of the input image which overlaps with the area of the pixel of each pixel of the output image in the setting that the area of the output image is shifted;

normalizes a value obtained by the integrating with respect to a dimension of the area of the pixel; and determines a binary data of the pixel by comparing between the value obtained by the normalizing and a predetermined value.

6. An image processing device comprising an image processing section which converts to expand an input image having a binary image of a dot-matrix form into an output image having a binary image represented in a dot-matrix form having a resolution equal to an integral multiple of a resolution of the input image, wherein the image processing section represents a density at an arbitrary position residing between pixels of the input image as an interpolating value obtained by interpolating vicinity pixels in the input image;

allots an area of a pixel of each pixel of the output image to the pixel, in a state of overlapping an area of the output image after a resolution conversion processing is completed, on an area of the input image, in a setting that a center of the area of a pixel at an edge section of the output image is shifted by less than a half of a pitch between output pixels from a pixel position of a pixel at an edge of the input image in a horizontal direction and a vertical direction;

integrates interpolated values of with respect to an area of a part of the input image which overlaps with the area of the pixel of each pixel of the output image in the setting that the area of the output image is shifted;

normalizes a value obtained by the integrating with respect to a dimension of the area of the pixel; and determines a binary data of the pixel by comparing between the value obtained by the normalizing and a predetermined value.

* * * * *